April 19, 1932. E. W. ALLEN 1,854,971
OIL FILTER MOUNTING
Filed Dec. 31, 1928
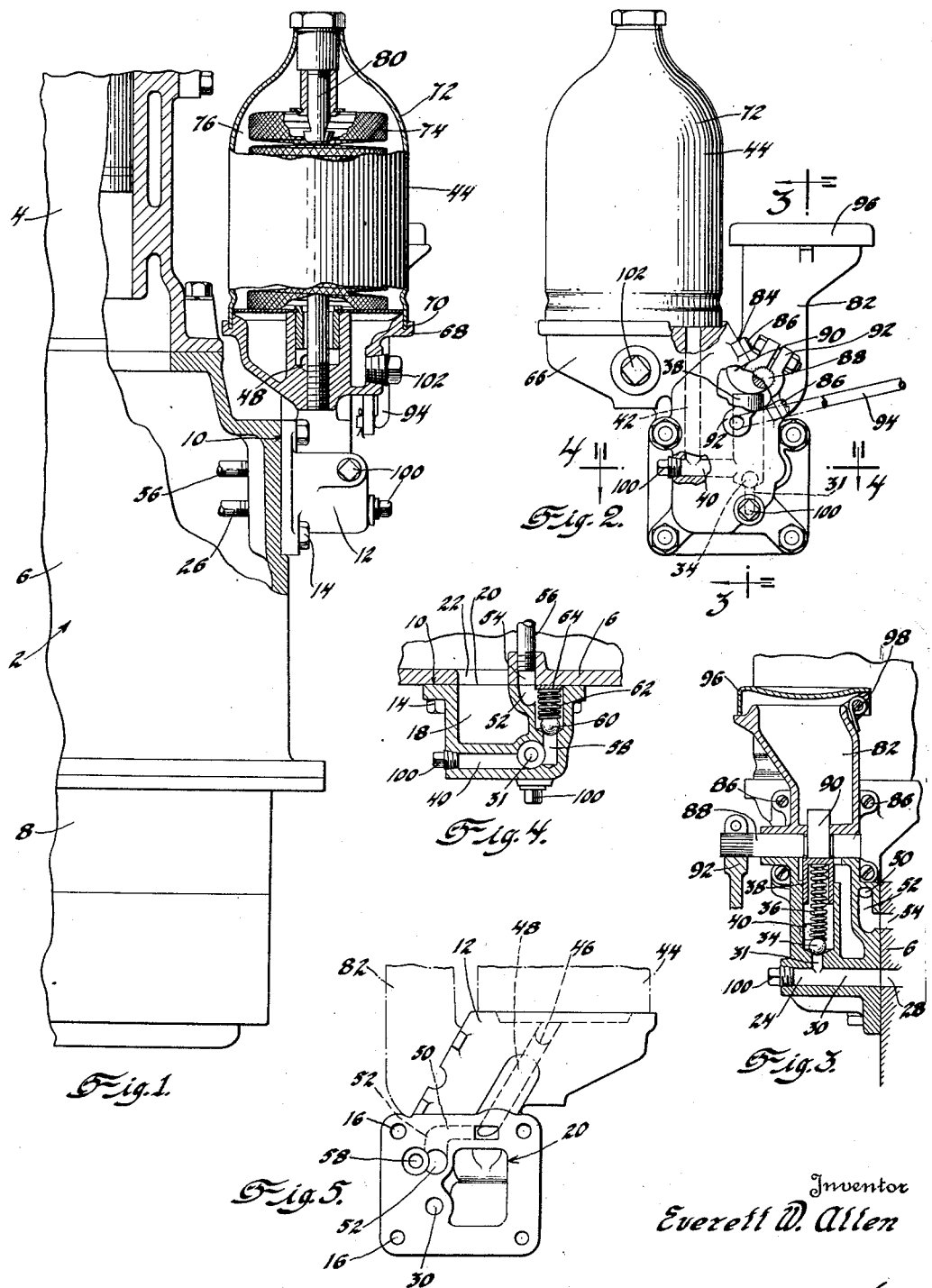
Inventor
Everett W. Allen
By Blackmore, Spencer & Hunt
Attorneys Patented Apr. 19, 1932

1,854,971

UNITED STATES PATENT OFFICE

EVERETT W. ALLEN, OF BIRMINGHAM, MICHIGAN, ASSIGNOR TO YELLOW TRUCK & COACH MANUFACTURING COMPANY, OF PONTIAC, MICHIGAN, A CORPORATION OF MAINE

OIL FILTER MOUNTING

Application filed December 31, 1928. Serial No. 329,412.

This invention relates to lubricating systems of prime movers and has particular reference to the prime movers or engines used on automotive vehicles.

Lubricating systems are usually provided with an oil filter which has customarily been positioned at the dash and necessitated a great deal of piping to conduct the oil from the oil pump to the filter and to return the lubricant to the engine. This piping has been objectionable in that it is likely to become damaged when working about the engine, offers an unnecessary number of joints at which leakage might occur, and is subject to being clogged or stopped by impurities or foreign matter in the oil. A filler spout or oil filler opening to replenish oil in the system is usually provided at the crank case or oil pan and this spout is usually constructed independent of the filter although a necessary part of the lubricating system.

It is an object of the present invention to eliminate the unnecessary piping and to combine the oil filter, lubricant spout, and lubricant by-pass in a single unit which is attached directly to the housing of an internal combustion engine, preferably at the crank case. The term housing is intended to include anything which encloses the working parts of the engine, for example, the engine block and oil pan, as well as the crank case. The object of the invention is accomplished by providing a bracket having a hollow portion and a shelf or extension on which the filter or lubricant purifier is mounted. The bracket is provided with suitable inlet and outlet passages to permit the oil to flow through the filter. The inlet is connected with the usual oil pump provided with a pressure relief valve and in the inlet there is provided a spring controlled valve subject to operation by a cam interconnected with the throttle. The bracket also includes a by-pass valve to relieve pressure on the filter or to prevent injuring the filter due to excessive pressure. The bracket also includes a separable filler spout, connection or opening having a hinged cover and through which new oil is supplied to the system. The filler spout is connected to the hollow portion of the bracket and the bracket in turn attached to a suitable part of the crank case but preferably at one side. The crank case is suitably provided with openings which mate with or conform to the inlet and outlet passages in the bracket and the hollow portion of the bracket. The filler spout thus also serves as a crankcase breather.

On the drawings:

Fig. 1 is a side view of a portion of an engine with parts shown in section to illustrate the application of the invention.

Fig. 2 is a side view of the structure of the invention with parts shown in section for purposes of clearer illustration.

Fig. 3 is a section on the line 3—3 of Fig. 2.

Fig. 4 is a section on the line 4—4 of Fig. 2.

Fig. 5 is a view of the bracket per se looking from the crank case side.

Referring to the drawings the numeral 2 indicates a prime mover in the present instance an internal combustion engine. The engine includes the cylinder block 4, crank case 6, and oil pan 8.

At any suitable point thereon but preferably at one side thereof the crank case is provided with a flattened portion indicated at 10. To this flattened portion there is secured the bracket 12 of the invention. The bracket is fastened to the crank case by means of the screw bolts 14 passing through the openings 16 in the bracket and screwed into suitable openings provided in the crank case.

The bracket is provided with the hollow portion 18 at its lower portion which hollow portion terminates in an opening 20 conforming to or mating with an opening 22 on the side of the crank case.

The bracket is also provided with the inlet passage or conduit 24 which receives the oil or lubricant from a pipe 26 connected to an opening 28 in the crank case 6. The intake passage or conduit 24 comprises the horizontal passage 30, the vertical passage 31 in which there is provided the ball valve 34 pressed against its seat by means of a spring 36, the upper portion of which is housed in a member 38 adapted to slide in the enlarged portion of the vertical passage 31. The intake passage 24 further comprises the second horizontal passage 40 and the second vertical passage 42 through which the oil is delivered to the filter 44.

The bracket 12 is also provided with an outlet passage 46 which includes the inclined portion 48, the horizontal portion 50 which terminates in a vertical portion 52 and delivers the lubricant to an opening 54 in the crank case, to which there is connected the outlet pipe 56.

Connected to the horizontal portion 40 of the intake passage 24 is a by-pass passage 58 in which there is positioned the ball valve 60 pressed against its seat by means of a spring 62. The spring is retained in the bracket by means of the washer 64 suitably secured to the face of the bracket abutting the crank case.

The flow of oil to and from the cylinder will be from the oil pump (not shown) through the pipe 26, into the intake passage 24 (which comprises the passage 30, 31, 40 and 42), into the filter and out through the outlet passage 46 (which comprises the inclined passage 48, horizontal passage 50, and vertical passage 52), into the opening 54 in the crank case, and to the outflow pipe 56 from where the oil may be allowed to drip into the crank case, return to the intake side of the pump, or delivered directly to the working parts of the engine.

In case of excessive back pressure on the filter, or in case the filter should be clogged, the oil will flow from the passage 31 into the by-pass passage 58 and lift the valve 60 off its seat and then flow into the passage 52 and through opening 54 and into the outlet pipe 56.

The oil filter 44 is supported on a shelf 66 integral with the bracket 12. The shelf has the annular portion 68 provided with a groove 70 in which the bottom edge of the container 72 of the filter is adapted to seat. The filter portion per se comprises the filtering unit 74 which may be for any suitable type such as that shown in the patent to McKinley No. 1,651,400, or similar to the filter of Barr, No. 609,769. The contaminated oil is delivered by the passage 42 to the space 76 around the filtering unit and after passing through the filtering material passes downwardly to the bottom of the filter toward the end of the passage 48, where it is returned to the lubricating system. The filter has a central supporting rod 80.

A filler spout or filler connection 82 preferably but not necessarily separably constructed from but forming a part of bracket 12, is secured at an inclined surface 84 to the bracket proper by means of the screws 86. The spout 82 is provided with the usual cover 96 hinged as at 98.

At the inclined surfaces between the spout and the bracket proper there is journalled the rocker arm or shaft 88, having secured thereto within the bracket 12 the cam 90 which is adapted to contact with and operate the slidable member 38. The end of the rock shaft 88 has attached thereto an arm 92 connected by means of a suitable link or rod 94 to the throttle valve (not shown) of the engine or carburetor. The direct connection to the throttle is not shown but as the throttle construction is of the conventional kind its illustration is not believed necessary.

The connection of the arm 92 and its cam 90 to the throttle is such that at throttle closed position the cam is in the position shown in Fig. 3 or will allow the passage of the maximum amount of oil. At full throttle open position the cam exerts its maximum pressure on the slidable member 38 and spring 36 to press the ball 34 tightly on its seat and prevent the passage of oil through the vertical passage 31. The object of this construction is to force more oil to the engine at full speed when the parts are under greatest stress or in need of more lubricant. At slow running or when the throttle is nearer its closed position there is no need for so great a quantity of oil and accordingly more oil is allowed to flow through the filter. As a result of this construction the bearings are not robbed or starved of oil when the lubricant is most needed.

Suitable plugs 100 are provided at various parts of the bracket to close the exposed ends of the passages, or to provide a drain opening as in the case of the plug 102 at the filter.

The opening in the spout at its inclined end communicates with the hollow portion 18 of the bracket. When it is desired to replenish or add lubricant the cover 96 is raised and the oil poured into the spout. The oil will flow down the throat of the spout into the hollow portion 18 and out through the opening 22 in the crank case.

The filler spout 82 and the hollow portion 18 of the bracket form a crank case breather as well as a means for replenishing oil. The fumes from the crankcase may escape from the opening 22, into the hollow portion 18 and out through the filler spout 82.

I claim:

1. In combination with the housing of an internal combustion engine or the like having a crank case and a lubricating system with a related lubricant filter, a member secured to said housing, said member comprising and including a lubricant filler spout or connection, a filter mounting, a crankcase breather, and a pressure relief means for the filter.

2. In combination with a prime mover having a crank case and a lubricating system with a related lubricant filter, a flat portion formed on the crankcase, a member secured to said flat portion, said member comprising and including a lubricant filler spout or connection, a filter mounting, a crankcase breather, and a pressure relief means for the filter.

3. In combination with the housing of an internal combustion engine or the like having a crank case and a lubricating system, a bracket secured to said housing, a lubricant filter mounted on said bracket, passages in said bracket to permit the ingress to and egress of lubricant from the filter, and a lubricant filler spout or connection and crank case breather on said bracket.

4. In combination with the housing of an internal combustion engine or the like having a crankcase and a lubricating system, a bracket secured to said housing, a lubricant purifier mounted on said bracket, lubricant passages in the bracket connecting the filter and crankcase to permit the ingress to and egress of lubricant from the filter, a lubricant bypass in said bracket connected directly to the crankcase, and a lubricant filler spout or connection and crankcase breather comprised in said bracket.

5. In combination with the housing of an internal combustion engine or the like having a crankcase and a lubricating system, a hollow bracket secured to said housing, a lubricant purifier secured to the bracket, passages in the bracket permitting in and out flow of lubricant to and from the filter, said bracket including a lubricant filler spout or connection and crankcase breather, said spout connecting with the hollow of said bracket to conduct the lubricant to the crankcase, said crankcase having an opening mating with the hollow of said bracket.

6. In combination with the housing of an internal combustion engine or the like having a crankcase and a lubricating system, a bracket secured to said housing, said bracket having a hollow portion, a lubricant purifier secured to the bracket, passages in the bracket connecting the purifier and crankcase to permit the flow of lubricant through the filter, a lubricant bypass in said bracket permitting bypassing of lubricant to the crankcase, a filler spout or connection included in said bracket said spout connecting with said hollow portion to permit the flow of lubricant to the crankcase, and said crankcase having an opening mating with the hollow portion.

7. In combination with the housing of an internal combustion engine or the like having a crankcase and a lubricating system, a bracket secured to said housing, said bracket having a hollow portion, a lubricant purifier secured to said bracket, passages in said bracket connecting said purifier and crankcase to permit the flow of lubricant through the filter, a spring pressed valve in the inlet passage to the purifier, means in said bracket for positively seating said valve to prevent flow of lubricant to the filter, and a filler spout or opening in said bracket said spout connected with said hollow portion to allow the flow of lubricant to the crankcase, and said crankcase having an opening mating with said hollow portion.

8. In combination with the housing of an internal combustion engine or the like having a crankcase, a throttle, and a lubricating system, a bracket secured to said housing, a lubricant purifier secured to said bracket, passages in said bracket between the purifier and the crankcase to allow for the flow of oil through the filter, a spring pressed valve in the purifier inlet passage, means interconnected with the throttle to be moved therewith for positively holding said valve on its seat, a bypass conduit in said bracket, and a lubricant filler spout or connection in said bracket.

9. In combination with a prime mover having a crankcase and a lubricating system, a bracket secured to said crankcase, a lubricant purifier secured to said bracket, passages in said bracket connecting the crankcase and purifier to permit the flow of oil therebetween, a spring pressed flow control valve in the purifier inlet passage, a bypass passage in the bracket, a spring pressed valve in the bypass, and a filler spout or connection in said bracket communicating with the crankcase.

10. In combination with a prime mover having a crankcase and a lubricating system, a bracket secured to the crankcase, a lubricant purifier secured to the bracket, means in said bracket to allow a flow of oil between the filter and crankcase, and a filler spout or connection on said bracket said spout or connection including a member separable from said bracket.

11. In combination with the housing of an internal combustion engine or the like having a throttle, a crankcase, and a lubricating system, a bracket secured to said housing, a lubricant purifier mounted on said bracket, passages in said bracket to permit the flow of lubricant through said filter, a valve in the purifier inlet passage, a cam mounted in the bracket to control said valve, and means interconnected with the throttle to be operated simultaneously therewith to move said cam to close the valve and shut off flow of lubricant to the filter.

12. In combination with the housing of an internal combustion engine or the like having a throttle, a crankcase, and a lubricating system, a bracket secured to said housing, a lubricant purifier mounted on said bracket, passages in said bracket to permit the flow of lubricant through said filter, a valve in the purifier inlet passage, a cam mounted in the bracket to operate said valve, means interconnected with the throttle to be operated simultaneously therewith to move said cam to close the valve and shut off flow of lubricant to the filter, and a lubricant filler connection in said bracket.

In testimony whereof I affix my signature.

EVERETT W. ALLEN.